No. 748,059. Patented December 29, 1903.

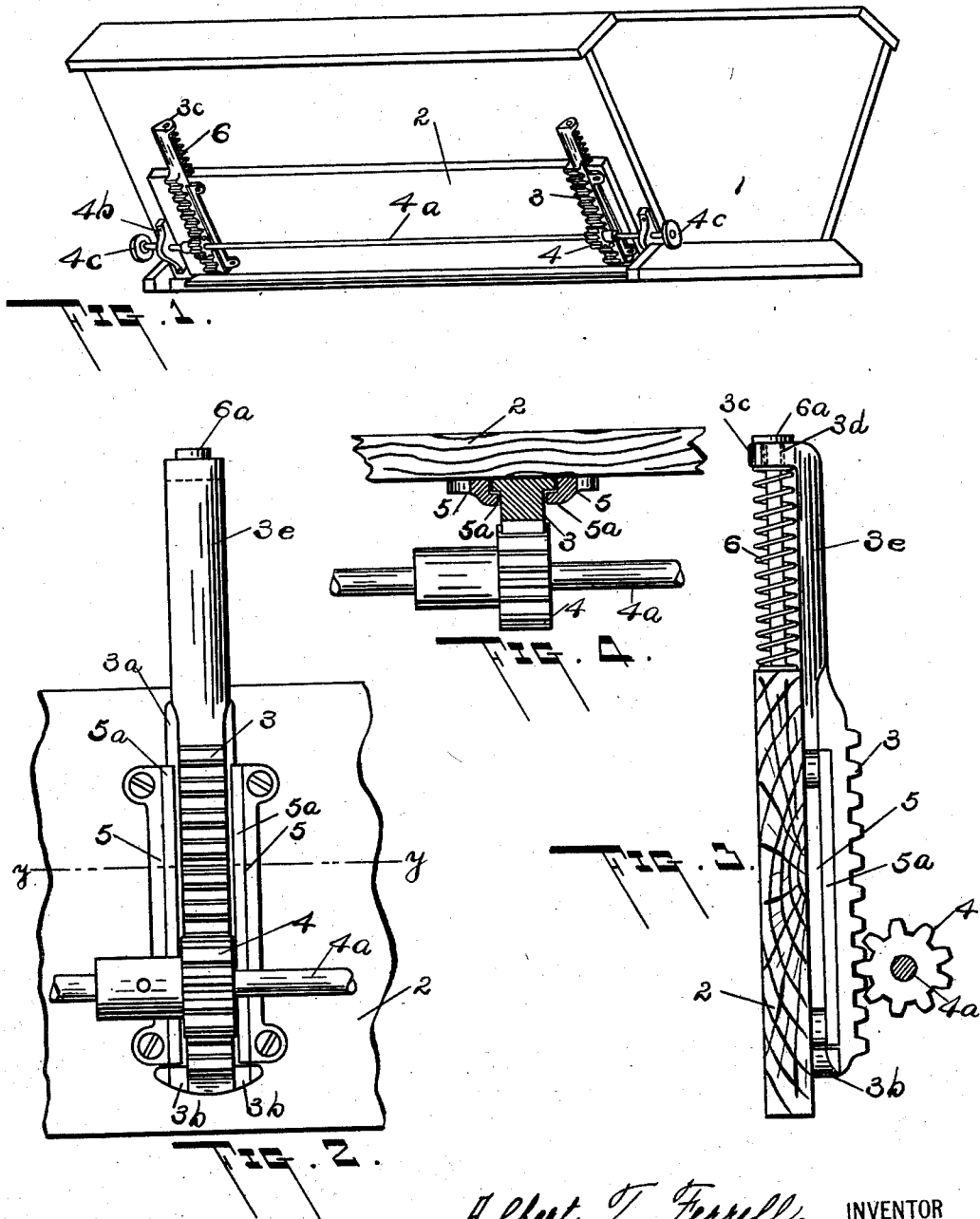

UNITED STATES PATENT OFFICE.

ALBERT T. FERRELL, OF SAGINAW, MICHIGAN.

FEED-REGULATOR FOR HOPPERS.

SPECIFICATION forming part of Letters Patent No. 748,059, dated December 29, 1903.

Application filed December 9, 1902. Serial No. 134,569. (No model.)

*To all whom it may concern:*

Be it known that I, ALBERT T. FERRELL, a citizen of the United States, residing at Saginaw, in the county of Saginaw and State of Michigan, have invented certain new and useful Improvements in Feed-Regulators for Hoppers; and I do hereby declare the following to be a full, clear, and exact description of the invention, such as will enable others skilled in the art to which it appertains to make and use the same.

This invention is a feed-regulator for hoppers. It is especially adapted for use on hoppers of grain and bean cleaners and like machines having a vibratory or shaking bottom to agitate its contents.

It comprises a sliding gate adjustable to regulate the feed-opening and provided with means for yieldingly supporting it in its adjusted positions.

The mechanism is illustrated in the accompanying drawings, in which—

Figure 1 is a perspective view of a hopper with my device attached. Fig. 2 is a front elevation in detail of one of the pinions and one of the racks engaging with it which is yieldingly secured to the gate of the hopper. Fig. 3 is a side elevation of the parts shown in Fig. 2, and Fig. 4 is a section on the line *y y* of Fig. 2.

Similar figures refer to similar parts throughout the several views.

The construction and operation of the device are as follows:

A hopper 1, having a sliding gate 2, supported and guided on one of its sides, is provided with racks 3, yieldingly secured to the gate, and pinions 4, engaging therewith, fixed on the rod $4^a$, which turns in bearings $4^b$, secured to the hopper and provided with hand-wheels $4^c$ or other means for its rotation. These racks are not rigidly fixed to the gate, but are slidably secured to it by guides 5, fixed to the gate by screws or otherwise, having flanges $5^a$, which project over flanges $3^a$ on the bases of the racks. The gate is thus allowed some movement upward from the position given by the racks; but downward movement is prevented by stops $3^b$ on the bases of the racks, which strike the lower ends of the guides 5. The upward movement is resisted by compressible coiled springs 6. The racks are provided with upwardly-extending members $3^e$, having lugs $3^c$ projecting over the gate, and the springs are held between the lugs and the top of the gate by pins $6^a$, passing through holes $3^d$ in the lugs and carried by the gate.

By this device the gate can be placed in any desired position. The stops $3^b$ prevent downward movement from this position; but the yielding of the springs permits it to rise slightly when necessary. Thus if a bean passes on end under the gate the springs will yield and allow the gate to rise slightly, so that the bean may pass through without breaking. Small stones and other obstacles which might choke the opening are passed through in the same way, and a regular even flow from the hopper is thus insured.

What I claim as my invention, and desire to secure by Letters Patent, is—

1. An adjusting member for sliding gates of hoppers and the like, comprising a revoluble pinion; a longitudinally-movable rack engaging the pinion; a gate slidably mounted on said rack and a spring member interposed between the rack and gate and adapted to yieldingly hold the gate in its lowest position on said rack.

2. A feed-regulator for hoppers comprising in combination a sliding gate; a pair of guides carried by the gate; a vertically-movable rack slidably mounted on each guide; a pair of pinions for operating said racks simultaneously; a compressible spring interposed between the end of each rack and the gate; together with stops to limit the downward movement of the gate.

3. A feed-regulator for hoppers comprising a sliding gate; a pair of flanged guides carried by the gate; a pair of vertically-movable racks having flanges slidably engaging each of the flanged guides; a pair of pinions for simultaneously operating the racks; a pair of compressible springs interposed between the ends of said racks and the gate; together with stops fixed to the lower ends of said racks to limit the downward movement of the gate, for the purposes set forth.

4. A feed-regulator for hoppers comprising a sliding gate; a vertically-movable rack at each end of said gate; lateral flanges on the bases of said racks; a pair of flanged guides overlapping the flanges on the rack; stops on the lower end of the racks to limit the downward movement of said gate; an upwardly-extending member on each rack; a lug on each of said members projecting over the top of the gate; a hole in each lug; a coiled compressible spring between the top of the gate and each lug; and a spring guiding-pin carried by the gate and passing through the hole in the lug; together with pinions engaging the racks for the purposes set forth.

In testimony whereof I affix my signature in presence of two witnesses.

ALBERT T. FERRELL.

Witnesses:
MARK D. GEER,
F. M. MARKS.